United States Patent
Ayeung et al.

(10) Patent No.: US 8,787,449 B2
(45) Date of Patent: Jul. 22, 2014

(54) OPTIMAL SEPARABLE ADAPTIVE LOOP FILTER

(75) Inventors: Cheung Ayeung, Sunnyvale, CA (US); Ali Tabatabai, Cupertino, CA (US); Minh Do, Champaign, IL (US)

(73) Assignee: Sony Corporation, Tokyo (JP)

( * ) Notice: Subject to any disclaimer, the term of this patent is extended or adjusted under 35 U.S.C. 154(b) by 323 days.

(21) Appl. No.: 13/071,258

(22) Filed: Mar. 24, 2011

(65) Prior Publication Data

US 2011/0249725 A1    Oct. 13, 2011

Related U.S. Application Data

(60) Provisional application No. 61/322,693, filed on Apr. 9, 2010.

(51) Int. Cl.
    H04B 1/66     (2006.01)
    H04N 7/26     (2006.01)
(52) U.S. Cl.
    CPC ....... *H04N 7/26978* (2013.01); *H04N 7/26319* (2013.01); *H04N 7/26212* (2013.01); *H04N 7/26271* (2013.01); *H04N 7/26382* (2013.01); *H04N 7/26058* (2013.01); *H04N 7/26244* (2013.01)
    USPC .................. 375/240.01; 382/240; 375/232
(58) Field of Classification Search
    USPC ..................................................... 375/240.01
    See application file for complete search history.

(56) References Cited

U.S. PATENT DOCUMENTS

| | | | |
|---|---|---|---|
| 4,667,304 A | | 5/1987 | Hier et al. |
| 5,473,376 A | * | 12/1995 | Auyeung .................. 348/403.1 |
| 5,486,863 A | * | 1/1996 | Auyeung et al. ......... 375/240.24 |
| 5,506,686 A | * | 4/1996 | Auyeung et al. ......... 358/426.03 |
| 5,537,155 A | * | 7/1996 | O'Connell et al. ........... 348/699 |
| 5,602,593 A | * | 2/1997 | Katto ........................ 375/240.16 |
| 5,619,341 A | * | 4/1997 | Auyeung et al. .............. 358/404 |
| 5,677,969 A | * | 10/1997 | Auyeung et al. .............. 382/239 |

(Continued)

FOREIGN PATENT DOCUMENTS

| | | |
|---|---|---|
| EP | 0 501 699 A2 | 9/1992 |
| EP | 2 104 355 A1 | 9/2009 |

(Continued)

OTHER PUBLICATIONS

Rusanovskyy, D. et al.—"Video Coding With Low-Complexity Directional Adaptive Interpolation Fileters"—IEEE Trans on Circuits and Systems for Video Technology, vol. 19, No. 8, Aug. 2009, pp. 1239-1243.

(Continued)

*Primary Examiner* — Dave Czekaj
*Assistant Examiner* — Kehinde O Abimbola
(74) *Attorney, Agent, or Firm* — John P. O'Banion (57) ABSTRACT

An adaptive loop filter utilizing separable filters within a quadtree-based adaptive loop filter (QALF). The filters for at least the P and B pictures are replaced with a separable filter to provide Separable QALF (SQALF). In a preferred embodiment the filter comprises a Wiener filter as a best fit approximation of the non-separable filter. In response to decoding with the SQALF approach, computational complexity in the decoder is reduced without lowering perceived visual quality. Estimation of the separable filter is obtained in the encoder by iteratively minimizing the sum of squares error with the separable filter. The SQALF filtering is described within a video decoder.

19 Claims, 5 Drawing Sheets

(56) References Cited

U.S. PATENT DOCUMENTS

| | | | |
|---|---|---|---|
| 5,764,307 A * | 6/1998 | Ozcelik et al. | 348/608 |
| 5,790,706 A * | 8/1998 | Auyeung | 382/248 |
| 5,793,314 A * | 8/1998 | Auyeung | 341/51 |
| 6,222,881 B1 | 4/2001 | Walker | |
| 6,813,315 B1 * | 11/2004 | Auyeung et al. | 375/240.16 |
| 6,891,890 B1 * | 5/2005 | Auyeung et al. | 375/240.16 |
| 6,934,332 B1 * | 8/2005 | Auyeung et al. | 375/240.16 |
| 7,027,510 B2 * | 4/2006 | Auyeung | 375/240.16 |
| 7,065,546 B2 * | 6/2006 | Auyeung et al. | 708/650 |
| 7,136,541 B2 * | 11/2006 | Zhang et al. | 382/300 |
| 7,426,462 B2 * | 9/2008 | Young et al. | 704/200.1 |
| 7,590,300 B2 * | 9/2009 | Tadas et al. | 382/260 |
| 7,751,631 B2 * | 7/2010 | Youn et al. | 382/232 |
| 8,120,660 B2 * | 2/2012 | Yan | 348/208.5 |
| 8,160,141 B2 * | 4/2012 | Auyeung | 375/240.13 |
| 8,189,677 B2 * | 5/2012 | Auyeung | 375/240.24 |
| 8,199,814 B2 * | 6/2012 | Auyeung | 375/240.03 |
| 8,199,823 B2 * | 6/2012 | Auyeung | 375/240.15 |
| 8,249,150 B2 * | 8/2012 | Auyeung | 375/240.03 |
| 8,249,151 B2 * | 8/2012 | Auyeung | 375/240.03 |
| 8,396,118 B2 * | 3/2013 | Auyeung | 375/240.03 |
| 2003/0185304 A1 * | 10/2003 | Auyeung | 375/240.16 |
| 2003/0191788 A1 * | 10/2003 | Auyeung et al. | 708/650 |
| 2004/0076343 A1 * | 4/2004 | Zhang et al. | 382/300 |
| 2005/0075888 A1 * | 4/2005 | Young et al. | 704/500 |
| 2005/0207501 A1 * | 9/2005 | Auyeung | 375/240.26 |
| 2005/0286792 A1 * | 12/2005 | Tadas et al. | 382/261 |
| 2008/0008249 A1 * | 1/2008 | Yan | 375/240.21 |
| 2008/0025409 A1 | 1/2008 | Tseng et al. | |
| 2008/0075165 A1 | 3/2008 | Ugar et al. | |
| 2008/0151999 A1 * | 6/2008 | Youn et al. | 375/240.03 |
| 2008/0232459 A1 * | 9/2008 | Auyeung | 375/240.01 |
| 2009/0232210 A1 * | 9/2009 | Auyeung | 375/240.13 |
| 2009/0257488 A1 * | 10/2009 | Auyeung | 375/240.03 |
| 2009/0257496 A1 * | 10/2009 | Auyeung | 375/240.15 |
| 2009/0257506 A1 * | 10/2009 | Auyeung | 375/240.24 |
| 2010/0074330 A1 * | 3/2010 | Fu et al. | 375/240.12 |
| 2010/0135398 A1 | 6/2010 | Wittmann et al. | |
| 2010/0158106 A1 * | 6/2010 | Auyeung | 375/240.03 |
| 2010/0158107 A1 * | 6/2010 | Auyeung | 375/240.03 |
| 2010/0246692 A1 * | 9/2010 | Rusanovskyy et al. | 375/240.29 |
| 2011/0222608 A1 * | 9/2011 | Gao et al. | 375/240.24 |
| 2011/0249725 A1 * | 10/2011 | Auyeung et al. | 375/240.03 |
| 2011/0261880 A1 * | 10/2011 | Auyeung | 375/240.12 |
| 2011/0305276 A1 * | 12/2011 | Auyeung et al. | 375/240.03 |
| 2012/0044988 A1 * | 2/2012 | Auyeung et al. | 375/240.03 |
| 2012/0183236 A1 * | 7/2012 | Auyeung et al. | 382/233 |
| 2012/0195377 A1 * | 8/2012 | Auyeung et al. | 375/240.12 |
| 2012/0230402 A1 * | 9/2012 | Auyeung et al. | 375/240.12 |

FOREIGN PATENT DOCUMENTS

| | | |
|---|---|---|
| EP | 2 157 799 A1 | 2/2010 |
| WO | 2008074117 A1 | 6/2009 |
| WO | 2009088340 A1 | 7/2009 |

OTHER PUBLICATIONS

Intel—"Adaptive (Wiener) Filter for Video Compression"—ITU—Telecommunications Standardization Sector, Study Group 16—Contribution 437, COM 16-C 437 R1-E, Apr. 2008, pp. 1-7.

Widmann, S. et al.—"Separable adaptive interpolation filter for video coding"—IEEE Int. Conf. on Image Processing, San Diego, CA, Oct. 12-15, 2008, pp. 2500-2503.

Chujoh, T. et al.—"Specification and experimental results of Quadtree-based Adaptive Loop Filter"—ITU—Telecommunications Standardization Sector, Study Group 16, Question 6, Video Coding Experts Group (VCEG) 37th Meeting, Yokohama, Japan, Apr. 15-18, 2009, pp. 1-11.

Toshiba Corporation—"Quadtree-based adaptive loop filter"—ITU—Telecommunications Standardization Sector Study Period 2009-2012; Study Group 16, Contribution 181, COM 16-C 181-E, pp. 1-4.

ISA/US, International Search Report and Written Opinion from corresponding PCT International patent app. No. PCT/US11/029835, claiming priority to U.S. Appl. No. 61/322,693, report issued May 17, 2011, with claims searched and examined, pp. 1-19.

* cited by examiner

OPTIMAL SEPARABLE ADAPTIVE LOOP FILTER

CROSS-REFERENCE TO RELATED APPLICATIONS

This application claims priority from U.S. provisional patent application Ser. No. 61/322,693 filed on Apr. 9, 2010, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image coder loop filtering, and more particularly to adaptive loop filtering.

2. Description of Related Art

Image and video signals are sometimes corrupted by Gaussian noise. Wiener filtering can reduce this noise effectively, and is perhaps the best linear restoration filter in the sense of Mean Square Error (MSE). The filter taps of Wiener filters can adapt with local signal and noise statistics.

Images reconstructed using adaptive loop filters have largely relied upon two dimensional Wiener filters. However, the computation of these two dimensional filters by the decoder comprises a significant overhead.

Accordingly, a need exists for an apparatus and method of adaptive filtering which can retain a high perceptual quality with less decoder computation. These needs and others are met within the present invention, which overcomes the deficiencies of previously developed adaptive filtering apparatus and methods.

BRIEF SUMMARY OF THE INVENTION

Adaptive loop filtering is taught for operation within an image coder using an optimal 2D separable adaptive loop filter and for designing Wiener filters without a loss of subjective video quality.

The present invention teaches a method of computing an optimal separable Wiener Filter as a good (sufficiently accurate) approximation of a non-separable filter. It should be appreciated that previous coding systems relied on non-separable filters, in particular Wiener filters. Incorporation of a separable filter within the present invention lowers decoder computational complexity while still maintaining video quality. The method and apparatus taught herein can be adopted to design optimal separable adaptive interpolation filters for use in encoder-decoder systems.

It should be appreciated that the separable Wiener filter is not necessarily the best (most accurate) approximation of the non-separable Wiener filter. The present invention provides a separable filter which is an optimized approximation of the non-separable Wiener filter.

The invention is amenable to being embodied in a number of ways, including but not limited to the following descriptions.

One embodiment of the invention is an apparatus, comprising: (a) a computer and associated memory configured for receiving encoded video signals; (b) programming executable on the computer for, (b)(i) entropy decoding; (b)(ii) reconstructing macroblocks using inverse quantization, inverse transforms, and prediction to reconstruct each macroblock; (b)(iii) executing a deblocking filter; (b)(iv) executing a quadtree based adaptive loop filter having separable filters for P and B pictures; and (b)(v) outputting a decoded video signal.

At least one implementation of the invention comprises the separable adaptive loop filters as separable Wiener filters. In at least one implementation of the invention, the separable filters are obtained in response to iteratively minimizing the sum of squares error in an encoder associated with the apparatus for decoding signals. In at least one implementation of the invention, the decoder programming is further configured for receiving differentially encoded coefficients within a slice header received from an encoder (e.g., within the encoded video data), which preferably defines the separable filters obtained during encoding in response to iteratively minimizing the sum of squares error. In at least one implementation of the invention the decoder has programming configured for applying a non-separable filter to I pictures. In at least one implementation of the invention, the two dimensional (2D) separable filter (f) is a product of a one-dimensional vertical filter and a one dimensional (1D) horizontal filter.

At least one implementation of the invention further comprises an encoder having a second computer, associated memory, and programming executable on the second computer for encoding of the encoded video signals, and obtaining the encoded two dimensional (2D) separable filter by iteratively improving a one dimensional (1D) vertical filter and a one dimensional (1D) horizontal filter alternatively by, (a) determining an initial estimate of the one dimensional (1D) horizontal filter and the one dimensional (1D) vertical filter from an initial non-separable two dimensional (2D) filter, (b) iteratively improving separable filters by alternatively holding a first of the one dimensional (1D) filters constant and determining a second of the one dimensional (1D) filters which minimizes a sum of square error, and (c) repeating iterations until there arise no significant changes in the two dimensional (2D) separable filter as a product of the one dimensional (1D) horizontal filter and the one dimensional (1D) vertical filter.

In at least one implementation of the invention, obtaining of the encoded two dimensional (2D) separable filter is determined with the product of the one dimensional (1D) horizontal filter and the one dimensional (1D) vertical filter converging, while each one dimensional (1D) filter is not required to converge. In at least one implementation, the non-separable two dimensional (2D) filter comprises an optimal two dimensional (2D) Weiner filter. In at least one implementation, the non-separable two dimensional (2D) filter comprises an approximation of an optimal two dimensional (2D) Weiner filter which has improved low pass frequency response over the optimal two dimensional (2D) Weiner filter.

One embodiment of the invention is an apparatus for encoding and decoding video signals, comprising: (a) an encoder having a first computer, associated memory, and programming executable on the first computer; (b) a decoder having a second computer, associated memory, and programming executable on the second computer for performing steps comprising: (b)(i) entropy decoding; (b)(ii) reconstructing macroblocks using inverse quantization, inverse transforms, and prediction to reconstruct each macroblock; (b)(iii) executing a deblocking filter; (b)(iv) executing a quadtree based adaptive loop filter having separable filters for P and B pictures; and (b)(v) outputting a decoded video signal; (b)(vi) wherein the separable filters are two dimensional (2D) filters as a product of a one-dimensional (1D) vertical filter and a one dimensional (1D) horizontal filter.

One embodiment of the invention is a method for decoding video signals, comprising: (a) entropy decoding of a video signal from a video encoder configured for performing iterations of a quadtree based adaptive loop filter to minimize a sum of squares error; (b) reconstructing macroblocks using inverse quantization, inverse transforms, and prediction to reconstruct each macroblock; (c) executing a deblocking filter; (d) executing, on a computer, a quadtree based adaptive loop filter having separable filters for P and B pictures, and one non-separable filter for I pictures, and (e) outputting a decoded video signal; (f) wherein the separable filters are a two dimensional (2D) filter as a product of a one-dimensional (1D) vertical filter and a one dimensional (1D) horizontal filter.

The present invention provides a number of beneficial elements which can be implemented either separately or in any desired combination without departing from the present teachings.

An element of the invention is an adaptive loop filter for use with video coding which reduces decoder computational overhead without lowering perceived image quality.

Another element of the invention is the estimation of separable Finite Impulse Response (FIR) loop filters for P (Prediction, forward) and B (Bi-directional prediction) pictures.

Another element of the invention is an adaptive loop filter which is compatible with quadtree-based block partitioning.

Another element of the invention is an adaptive loop filter having two one-dimensional (1D) filters and a DC bias.

Another element of the invention is the estimation of the separable filters in response to iteratively minimizing coding error, such as the sum of squares error within an encoder.

Another element of the invention is an encoder which passes differentially encoded coefficients within a slice header to a decoder which receives these coefficients to implement separable filters obtained during encoding in response to iteratively minimizing the sum of squares error.

Another element of the invention is the application of non-separable filters to I pictures.

Another element of the invention is an encoder-decoder apparatus in which an encoder determines coefficients for the separable filters and passes these in the video data for use by a decoder which executes the separable filters.

Another element of the invention is an adaptive loop filter in which the separable filters for P and B pictures are not required to have zero phase.

Another element of the invention is an adaptive loop filter comprising a Wiener filter.

A still further element of the invention is an adaptive Wiener loop filter optimized according to a bottom-up rate-distortion optimization of quadtree data structures.

Further elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

1. In-Loop SQALF Filtering

Figure 1:
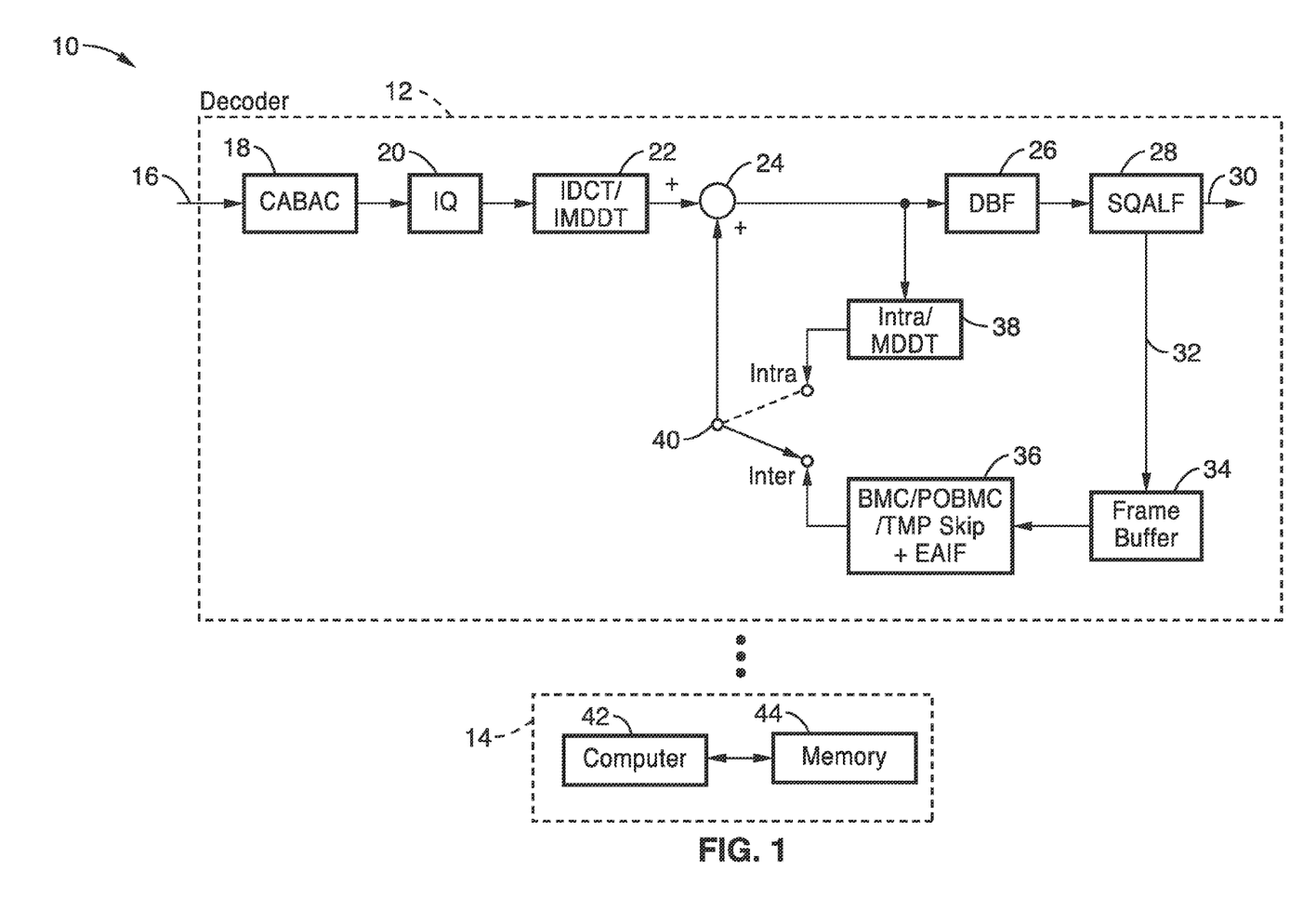
FIG. 1 is a block diagram of a decoder system utilizing separable adaptive loop filter (SQALF) according to an embodiment of the present invention.

FIG. 1 illustrates an example embodiment 10 of a decoder operating according to the present invention showing operations 12 which are preferably carried out in response to programming which executes on a computer processor 14. An encoded signal is received 16, upon which a context adaptive coding 18 is performed, such as Context-Adaptive Binary Arithmetic Coding (CABAC).

It will be appreciated that CABAC is a form of entropy coding used in H.264/MPEG-4 AVC video encoding to provide a lossless compression at high levels of compression although it requires a substantial processing overhead. It should be noted that other forms of context adaptive coding methods may be utilized without departing from the teachings of the present invention, for example Context-Adaptive Variable-Length Coding (CAVLC), and others without limitation. These context adaptive coding techniques are modified for operation with SQALF filtering according to aspects of the present invention. By way of example, and not limitation, the filter coefficients can be quantized and differentially encoded, with the differences being passed to the decoder in a desired manner. In one preferred embodiment these coefficients are encodes in the slice header, such as by Universal Variable Length Coding (UVLC), for receipt by the decoder.

Macroblocks are reconstructed from the image signals using Inverse Quantization (IQ) 20, followed by an inverse transform 22, such as Inverse DCT (IDCT) or an Inverse Mode Dependent Directional Transform (IMDDT). The signal is summed 24 with inter/intra signal information and received by a Deblocking Filter (DBF) 26 whose output is processed using a Separable Quadtree-based Adaptive Loop Filter (SQALF) 28 according to an embodiment of the present invention to output a decoded output 30. Image frames from SQALF are then buffered in a frame buffer 34, and then motion compensation 36 is performed, such as using Block Motion Compensation (BMC), Parametric Overlapped BMC (POBMC), TMP Skip with Enhanced Adaptive Interpolation Filter (EAIF), or the like, to provide interframe information for selection by selector 40, which selects between Inter frame information 36 or Intra frame information 38, to be summed 24 with the decoded blocks signal.

The decoding is shown preferably executed on a processor 12, such as having at least one computer 42 configured for receiving encoded video signals and one or more associated memories 44. It should be appreciated that the processing element can be implemented with any desired mix of fixed or programmable processing elements configured for carrying out the described method steps. It will also be appreciated that elements of the present invention can be implemented as programming stored on a media, such as a memory 44, for execution by an image processing system. It should also be appreciated that an encoder according to the invention is similarly configured as shown in FIG. 1, and executes programming from a computer processor and memory for video encoding including the determination of separable filter coefficients as described herein.

Figure 2:
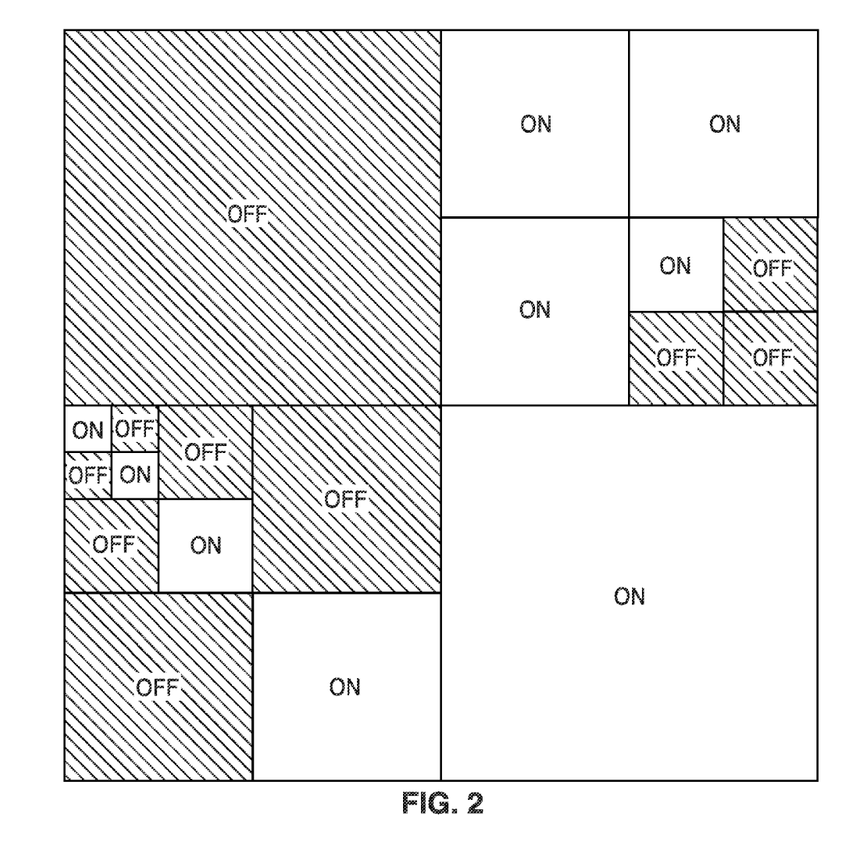
FIG. 2 is a diagram of Quadtree block partitioning as utilized according to an element of the present invention.

FIG. 2 depicts the general structure of quadtree blocks for Quadtree-based adaptive loop filters (QALF). It will be recognized that QALF has been utilized for improving coding efficiency by dividing a picture into quadtree blocks in which the quadtree blocks indicated by "ON" are filtered by a non-separable Finite Impulse Response (FIR) loop filter and the quadtree blocks indicated by "OFF" are not filtered. The loop filter preferably comprises a Weiner filter, and it is optimized according to QALF using a conventional bottom-up rate-distortion optimization of the quadtree data structure.

It will be noted that in QALF, the filters are zero-phase and non-separable. However, in the present invention, different processing steps are performed to reduce computation in the decoder, by replacing non-separable zero-phase FIR filters for P pictures (forward Predicted pictures) and B (Bi-directional predicted pictures) pictures in QALF by separable filters to form Separable-QALF (SQALF). To maintain picture quality, the separable filters are not required to have zero phases and they are not preferably applied to I pictures (reference frames).

2. Design of Separable Least Squares Filter

Figure 3:
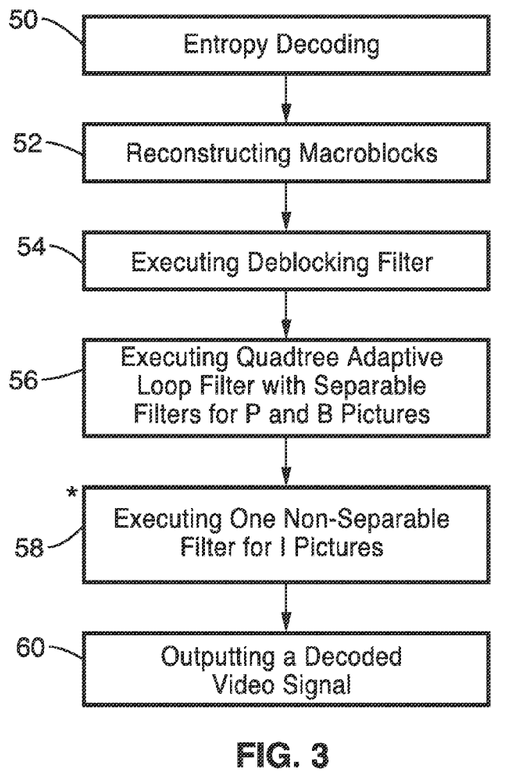
FIG. 3 is a flowchart of entropy decoding using SQALF according to an embodiment of the present invention.

FIG. 3 illustrates an example embodiment of the invention for performing adaptive filtering using the separable quadtree adaptive loop filters. Entropy decoding is performed in block 50, followed by a reconstruction of the macroblocks 52, deblocking 54 by a deblocking filter, and the execution of a Quadtree adaptive loop filter with separable filters for the P and B pictures 56. It will be appreciated that the extraction of video data and filter coefficients from the video data (as supplied by an encoder) is not shown in the figure for the sake of simplicity. Typically, one non-separable filter is applied 58 for I pictures. Decoded video signals (I, P and B) are then output 60 from the decoder.

In the present invention, the separable loop filters are derived in the encoder from the non-separable loop filters by iteratively minimizing a least square error in the following manor.

Let y be the original pixels inside the "ON" regions of the quadtree structure, $S_y$. Let x be the decoded image. The goal of the Weiner filtering is to find a two dimensional (2D) FIR filter $f_o$ with support $S_f$ and a DC bias $f_n$ term so that $$\hat{y}=x*f_o+f_n$$

represents the best approximation of y in the least-square sense.

More specifically, letting $S_y$ and $S_f$ denote the support of y and $f_o$, respectively, and letting $S_f$ have n coefficients. Whereby the filtered image $\hat{y}$ is computed for each gel position $m \in S_y$ by:

$$\hat{y}[m] = \sum_{k \in S_f} f_o[k] \times [m-k] + f_n.$$

The above convolution and DC bias can be expressed in the following form as $$\hat{y}_m = x_m^T f_o + f_n.$$

Then the sum of squares error is defined as $$\xi(f) = \sum_{m \in S_y} (y_m - x_m^T f_o - f_n)^2 \quad (1)$$

$$= \sum_{m \in S_y} (y_m - \chi_m^T f)^2$$

$$= \sum_{m \in S_y} (y_m)^2 + f^T \left( \sum_{m \in S_y} \chi_m \chi_m^T \right) f - 2 \left( \sum_{m \in S_y} y_m \chi_m^T \right) f$$

$$= \sum_{m \in S_y} (y_m)^2 + f^T A f - 2 b^T f$$

where $\chi_m^T = [x_m^T \; 1]$ and $f^T = [f_o^T \; f_n]$.

The 2D non-separable Wiener filters are then obtained as the minimizer of $\xi(f)$ with the constraint that $f_o$ is symmetric across the center of its impulse response.

In previous approaches, the filter $f_o$ was either a 5×5, 7×7, or 9×9 filter. In general an n×n filter $f_o$ can be represented as a n×n matrix $F_o$ $$F_0 = \begin{bmatrix} f_{0,0} & f_{0,1} & \cdots & f_{0,n-1} \\ f_{1,0} & f_{1,1} & \cdots & f_{1,n-1} \\ \vdots & \vdots & \ddots & \\ f_{n-1,0} & f_{n-1,1} & \cdots & f_{n-1,n-1} \end{bmatrix} \quad (2)$$

where $n \in \{5,7,9\}$.

To reduce computation in the decoder and to maintain picture quality, the present invention replaces the non-separable filter $F_o$ for P and B pictures by separable filters and modifies other decoding elements accordingly, such as changing the entropy coding to support SQALF. Accordingly, in the present invention it is assumed that $$F_o = gh^T$$

$$f_n = g_n h_n \quad (3)$$

where $g=[g_0 \; g_1 \ldots g_{n-1}]^T$ and $h=[h_0 \; h_1 \ldots h_{n-1}]^T$ are n dimensional vectors and $g_n$ and $h_n$ are scalars.

The two dimensional (2D) separable filter is a product of a one-dimensional (1D) vertical filter and a one dimensional (1D) horizontal filter. More particularly, the 2D separable filter is obtained by the encoder in response to the execution of programming for iteratively improving the vertical filter and the horizontal filter alternatively by, (a) determining an initial estimate of the 1D horizontal filter and the 1D vertical filter from an initial non-separable 2D filter, (b) iteratively improving separable filters by alternatively holding one of the 1D filters constant and determining the other 1D filter which minimizes the sum of square error ξ(f), and (c) repeating iterations until there arise no significant changes in the 2D separable filter as a product of the 1D horizontal filter and the 1D vertical filter.

Figure 4:
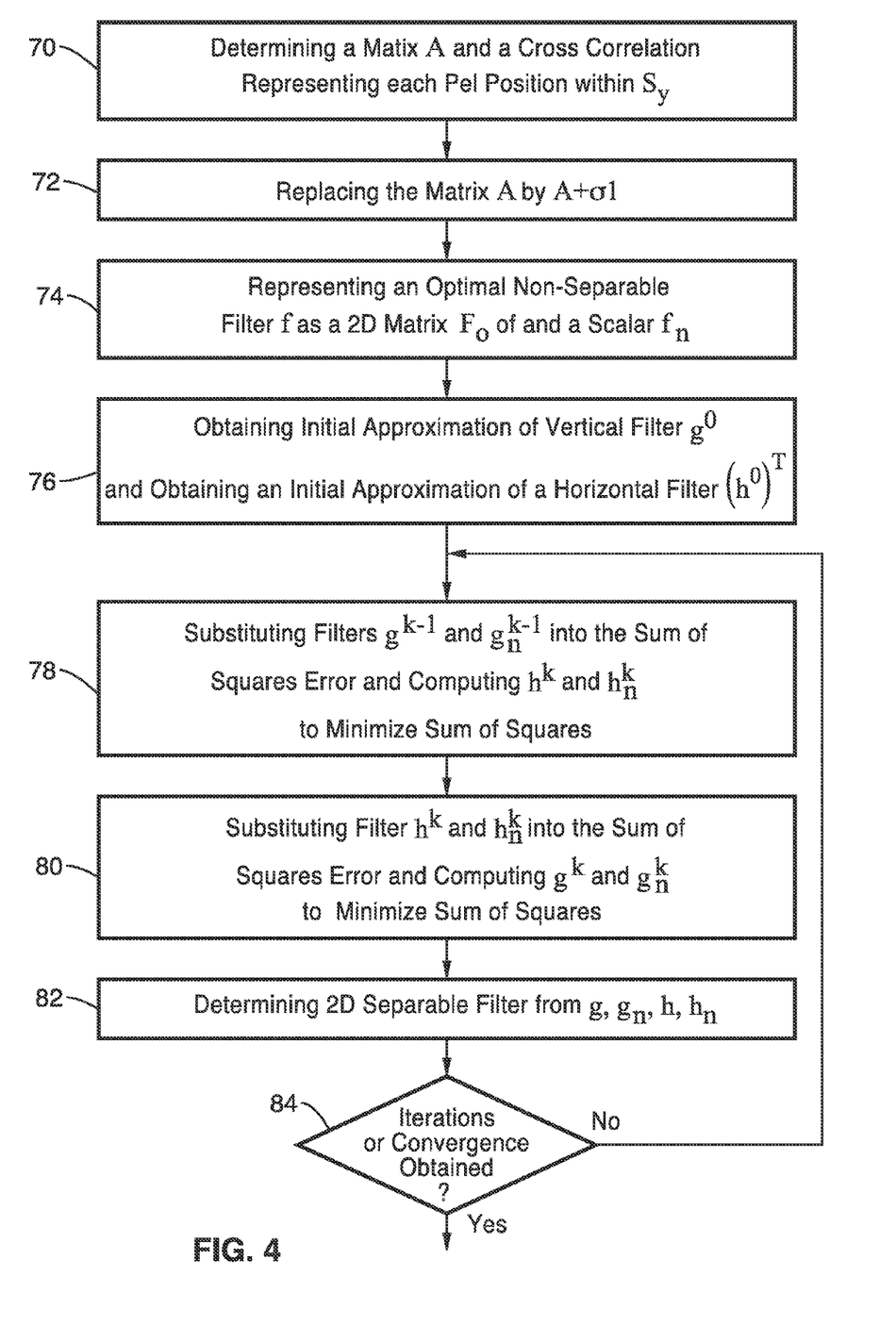
FIG. 4 is a flowchart of iteratively minimizing the sum of squares error according to an embodiment of the present invention.

FIG. 4 illustrates an example embodiment for obtaining the optimal separable filter by iteratively minimizing the sum of squares error ξ(f). In block 70, a matrix A and a cross correlation are determined representing each pel position within $S_y$, followed by replacing 72 the matrix A with A+σ1, and representing 74 an optimal non-separable filter f as a 2D matrix $F_o$ and a scalar $f_n$. Initial approximation is then obtained 76 of vertical filter $g^0$ and an initial approximation of a horizontal filter $(h^0)^T$.

Iterative processing is performed in response to substituting 78 the (k−1)th vertical filter $g^{k-1}$ and $g_n^{k-1}$ into the sum of squares error and computing the best k-th horizontal filter $h^k$ and $h_n^k$ which minimizes the sum of squares error, substituting 80 k-th horizontal filter $h^k$ and $h_n^k$ into the sum of squares error and computing the best k-th vertical filter $g^k$ and $g_n^k$ to minimize the sum of squares error, followed by determining 82 the k-th 2D separable filter from $g^k$, $g_n^k$, $h^k$, $h_n^k$.

It is then determined 84 whether to continue the iterations, such as in response to determining if a desired number of iterations has been performed and/or in response to obtaining a desired convergence of the k-th 2D separable filter.

The following describes the above process in greater detail:

Step 1. Compute A and b as in Eq. (1) assuming that the 2D filter $F_o$ is not zero phase.

Step 2. Replace A by A+σI where σ is 0.1 times the number of pixels in $S_y$.

Step 3. Compute the optimal non-separable filter f from Eq. (1) and represent it as a 2D matrix $F_o$ and a scaler $f_n$.

Step 4. Obtain the initial approximation of the vertical filter $g^0$ by adding the column vector of the optimal filter $F_o$. Obtain the initial approximation of the horizontal filter)$(h^0)^T$ by adding the row vectors of the optimal filter $F_o$. Also let $g_n^0 = f_n$ and $h_n^0 = 1$.

Step 5. Repeat Steps 1-4, for k=1, . . . , 10 or until $g_k h_k^T$ converges:

(a) Substitute $g^{k-1}$ and $g_n^{k-1}$ into Eq. (1) based on Eq. (3). Compute $h^k$ and $h_n^k$ which minimize Eq. (1).

(b) Substitute $h^k$ and $h_n^k$ into Eq. (1) based on Eq. (3). Compute $g^k$ and $g_n^k$ which minimizes Eq. (1).

Step 6. Let $g^K=[g_0^K\ g_1^K\ \ldots\ g_{n-1}^K]^T$, $g_n^K$, $h^K=[h_0^K\ h_1^K\ K\ h_{n-1}^K]^T$, $h_n^K$ be the results of K iterations from Step 5. The final separable filter g, $g_n$, h, $h_n$ as defined in Eq. (3) are given as follows:

$$g = g^K \cdot h_{n/2}^K \quad (4)$$

$$h = h^K \cdot \frac{1}{h_{n/2}^K} \quad (5)$$

$$f_n = g_n^K \cdot h_n^K. \quad (6)$$

3. Quantization of Separable Loop Filter Coefficients

For the sake of compatibility, the Separable QALF (SQALF) filter coefficients can be quantized in the same manner as QALF filter coefficients. In particular, the filter coefficients can be scaled by 256 and clipped to the range [−512,511]. The DC bias is scaled by 256 and clipped to the range $[-2^{14}, 2^{14}-1]$.

4. Entropy Coding of Separable Loop Filter Coefficients

In addition, the entropy coding of the quantized SQALF coefficients can be performed in the same manner as the entropy coding of quantized QALF coefficients. These coefficients are differentially encoded, and the differences are encoded into the encoded output, preferably output within the slice header by Universal Variable Length Coding (UVLC).

It will be appreciated that in QALF, each n×n loop filter has zero phase and it has $(n^2+1)/2$ independent coefficients and a DC bias. Accordingly, each QALF loop filter has a total of $(n^2+1)/2+1$ coefficients encoded in the slice header by UVLC.

In contrast, SQALF has two one-dimensional filters and a DC bias. The vertical filter g has n independent coefficients. Since $h_{n/2}=1$ by construction, the horizontal filter h has n−1 independent coefficients. Consequently, the SQALF loop filter has a total of 2n coefficients encoded in the slice header by UVLC.

5. SQALF in an Encoder-Decoder System

Figure 5:
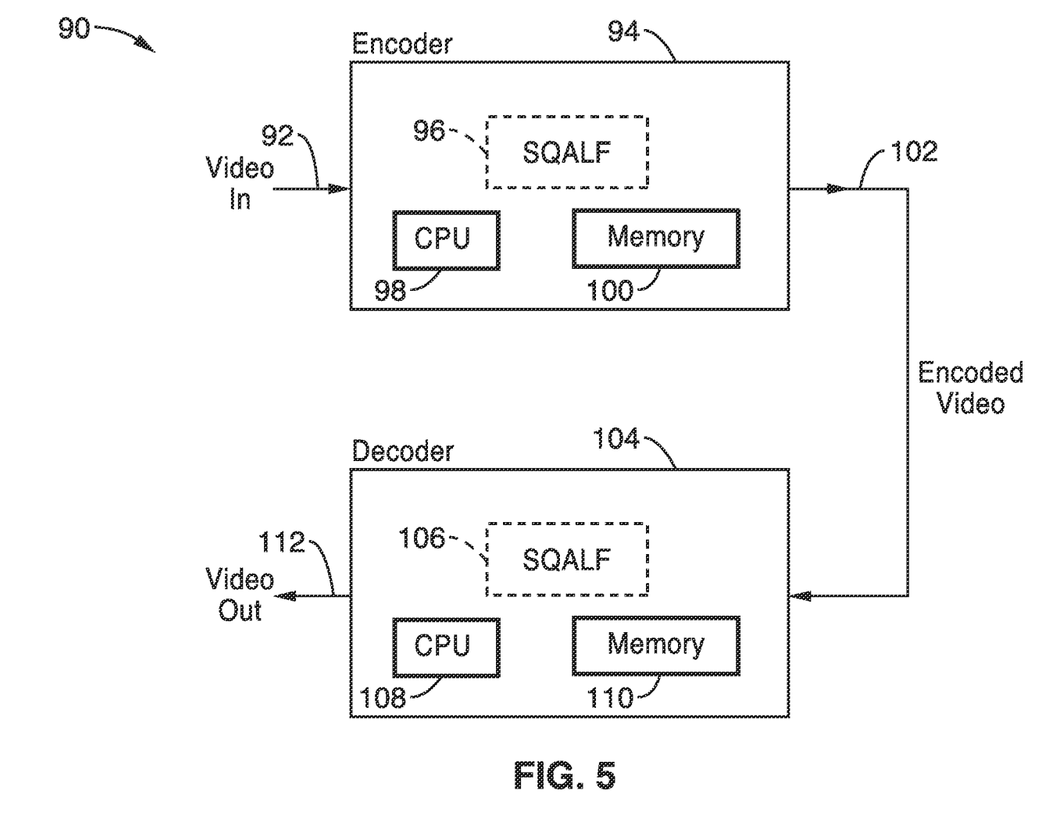
FIG. 5 is a block diagram of an encoder-decoder system utilizing separable adaptive loop filter (SQALF) according to an embodiment of the present invention.

FIG. 5 illustrates an example embodiment 90 of an encoder-decoder system configured for executing the separable adaptive loop filter (SQALF) according to the present invention. It will be appreciated that a video decoder performs, to the extent practical, an inversion of each stage of the encoding process. An encoder 94 is seen receiving a video signal 92, which is encoded, including the Separable-QALF filtering 96 described herein, in response to programming executing from a memory 100 on a computer processor 98 (CPU) and outputting an encoded video signal 102. Similarly, decoder 104 receives the encoded signal 102 and decodes the signal, including the Separable-QALF filtering 106, in response to programming executing from a memory 110 on a computer processor 108 (CPU), and outputting a video signal 112 which closely corresponds to the original video signal 92.

The present invention provides methods and apparatus for an improved adaptive loop filter which utilizes separable filters to form a Separable-QALF (SQALF). Inventive teachings can be applied in a variety of apparatus and applications, including video coders (CODECS), and similar image processing apparatus. Embodiments of the present invention may include but are not limited to the following:

1. An apparatus, comprising: (a) a computer configured for receiving encoded video signals; and (b) programming executable on said computer for processing said encoded video signals by performing one or more steps comprising: (i) performing entropy decoding; (ii) reconstructing macroblocks using inverse quantization, inverse transformations, and prediction to reconstruct each macroblock; (iii) executing a deblocking filter; (iv) executing a quadtree based adaptive loop filter having separable filters for P and B pictures and outputting a decoded video signal; and (v) outputting a decoded video signal.

2. The apparatus recited in embodiment 1, wherein said separable adaptive loop filters comprise separable Wiener filters.

3. The apparatus recited in embodiment 1, wherein said programming performs one or more steps comprising receiving differentially encoded coefficients within a slice header received from an encoder which defines separable filters obtained during encoding in response to iteratively minimizing the sum of squares error.

4. The apparatus recited in embodiment 1, wherein said executing a quadtree based adaptive loop filter comprises applying a non-separable filter to I pictures.

5. The apparatus recited in embodiment 1, wherein said separable filter comprises a two dimensional (2D) separable filter, f, that is a product of a one-dimensional (1D) vertical filter and a one dimensional (1D) horizontal filter.

6. The apparatus recited in embodiment 5, further comprising: an encoder, said encoder comprising a second computer and programming executable on said second computer, for generating said encoded video signals and obtaining said encoded two dimensional (2D) separable which iteratively improves a one dimensional (1D) vertical filter and a one dimensional (1D) horizontal filter alternatively, by performing one or more steps comprising: determining an initial estimate of the one dimensional (1D) horizontal filter and the one dimensional (1D) vertical filter from an initial non-separable two dimensional (2D) filter; iteratively improving separable filters by alternatively holding a first of said one dimensional (1D) filters constant and determining a second of said one dimensional (1D) filters which minimizes a sum of square error; and repeating iterations until there arise no significant changes in the two dimensional (2D) separable filter as a product of the one dimensional (1D) horizontal filter and the one dimensional (1D) vertical filter.

7. The apparatus recited in embodiment 6, wherein said product of the one dimensional (1D) horizontal filter and the one dimensional (1D) vertical filter converges, while each one dimensional (1D) filter is not required to converge.

8. The apparatus recited in embodiment 6, wherein said non-separable two dimensional (2D) filter comprises an optimal two dimensional (2D) Weiner filter.

9. The apparatus recited in embodiment 6, wherein said non-separable two dimensional (2D) filter comprises an approximation of an optimal two dimensional (2D) Weiner filter which has improved low pass frequency response over said optimal two dimensional (2D) Weiner filter.

10. An apparatus for encoding and decoding video signals, comprising: (a) an encoder comprising a first computer and programming executable on said first computer for encoding video signals; and (b) a decoder comprising a second computer and programming executable on said second computer for processing video signals encoded by said encoder by performing steps comprising: (i) performing entropy decoding; (ii) reconstructing macroblocks using inverse quantization, inverse transforms, and prediction to reconstruct each macroblock; (iii) executing a deblocking filter; (iv) executing a quadtree based adaptive loop filter having separable filters for P and B pictures; and (v) outputting a decoded video signal; (vi) wherein said separable filters comprises two dimensional (2D) filters as a product of a one-dimensional (1D) vertical filter and a one dimensional (1D) horizontal filter.

11. The apparatus recited in embodiment 10, wherein said quadtree adaptive loop filter comprises separable Wiener filters.

12. The apparatus recited in embodiment 10, wherein said programming on said first computer obtains said separable filter, f, in response to iteratively minimizing sum of squares error $\xi(f)$, by performing steps comprising: (a) determining a matrix A of size $S_h \times S_h$ and a cross correlation b within an equation $$\xi(f) = \sum_{m \in S_y} (y_m)^2 + f^T A f - 2b^T f,$$

in which m represents each pel position within $S_y$, which denotes support of y as pixels within ON regions of a quadtree structure, T represents transposition of a vector, and assumes that a two dimensional (2D) filter is not zero phase; (b) replacing A by A+σ1 where σ is a predetermined fraction of number of pixels in $S_y$; (c) representing an optimal non-separable filter f as a two dimensional (2D) matrix $F_o$ and a scalar $f_n$; (d) obtaining an initial approximation of the vertical filter $g^0$ by adding a column vector of optimal filter $F_o$, and obtaining an initial approximation of a horizontal filter $(h^0)^T$ by adding row vectors of optimal filter $F_o$, while letting $g_n^0 = f_n$ and $h_n^0 = 1$; and (e) repeating a desired number of iterations k, or until a desired level of convergence is obtained, one or more steps comprising: (i) substituting filter $g^{k-1}$ and $g_n^{k-1}$ into a sum of squares error and computing $h^k$ and $h_n^k$ to minimize the sum of squares error; (b) substituting filter $h^k$ and $h_n^k$ into the sum of squares error and computing $g^k$ and $g_n^k$ to minimize the sum of squares error; and (c) determining separable filter g, $g_n$, h, $h_n$, as $g = g^k \cdot h_{n/2}^k$, $$h = h^k \cdot \frac{1}{h_{n/2}^k},$$

$f_n = g_n^k \cdot h_n^k$, in response to letting $g^k = [g_0^k \, g_1^k \, \ldots \, g_{n-1}^k]^T$, $g_n^k$, $h^k = [h_0^k \, h_1^k \, \ldots \, h_{n-1}^k]^T$, $h_n^k$.

13. The apparatus recited in embodiment 10, wherein said programming of said first computer obtains said two dimensional (2D) separable filter in response to iteratively improving a one dimensional (1D) vertical filter and a one dimensional (1D) horizontal filter alternatively, by performing one or more steps comprising: determining an initial estimate of the one dimensional (1D) horizontal filter and the one dimensional (1D) vertical filter from an initial non-separable two dimensional (2D) filter; iteratively improving separable filters by alternatively holding one of the one dimensional (1D) filters constant and determining the other one dimensional (1D) filter which minimizes the sum of square error; and repeating iterations until there arise no significant changes in the two dimensional (2D) separable filter as a product of the one dimensional (1D) horizontal filter and the one dimensional (1D) vertical filter.

14. The apparatus recited in embodiment 13, wherein said product of said one dimensional (1D) horizontal filter and said one dimensional (1D) vertical filter converges, while each one dimensional (1D) filter is not required to converge.

15. The apparatus recited in embodiment 13, wherein said non-separable two dimensional (2D) filter comprises an optimal two dimensional (2D) Weiner filter.

16. The apparatus recited in embodiment 13, wherein said non-separable two dimensional (2D) filter comprises an approximation of an optimal two dimensional (2D) Weiner filter which has improved low pass frequency response over said optimal two dimensional (2D) Weiner filter.

17. A method for decoding encoded video signals received from a video encoder, the video encoder configured for performing iterations of a quadtree based adaptive loop filter to minimize a sum of squares error, the method comprising: performing entropy decoding of the video signals; reconstructing macroblocks using inverse quantization, inverse transforms, and prediction to reconstruct each macroblock;

executing a deblocking filter; executing, on a computer, a quadtree based adaptive loop filter having separable filters for P and B pictures, and one non-separable filter for I pictures; and outputting a decoded video signal; wherein said separable filters are a two dimensional (2D) filter as a product of a one-dimensional (1D) vertical filter and a one dimensional (1D) horizontal filter.

18. The method recited in embodiment 17, wherein said quadtree based adaptive loop filter comprises separable Wiener filters.

19. The method recited in embodiment 17, wherein the entropy decoding comprises receiving differentially encoded coefficients within a slice header received from an encoder which defines separable filters obtained during encoding in response to iteratively minimizing the sum of squares error.

20. The method recited in embodiment 17, wherein said two dimensional (2D) separable filter is obtained in a video encoder in response to iteratively improving a one dimensional (1D) vertical filter and a one dimensional (1D) horizontal filter.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus, comprising:
   (a) a computer configured for receiving encoded video signals; and
   (b) programming executable on said computer for processing said encoded video signals by performing one or more steps comprising:
      (i) performing entropy decoding;
      (ii) reconstructing macroblocks using inverse quantization, inverse transformations, and prediction to reconstruct each macroblock;
      (iii) executing a deblocking filter;
      (iv) executing a quadtree based adaptive loop filter having separable filters for P and B pictures;
      (v) wherein said separable filters are separable two dimensional (2D) filters determined as a product of a one-dimensional (1D) vertical filter and a one dimensional (1D) horizontal filter;
      (vi) wherein said 1D horizontal filter and said 1D vertical filter are initially determined from a non-separable 2D filter, followed by iteratively minimizing error for pixels within ON regions of a quadtree structure of said quadtree based adaptive loop filter;
      (vii) wherein said minimizing error is performed by determining a matrix and a cross correlation that assumes said 2D separable filter is not zero phase, and performing a transposition on the 2D separable filter and cross correlation; and
      (viii) outputting a decoded video signal.

2. The apparatus recited in claim 1, wherein said separable adaptive loop filters comprise separable Wiener filters.

3. The apparatus recited in claim 1, wherein said programming performs one or more steps comprising receiving differentially encoded coefficients within a slice header received from an encoder which defines separable filters obtained during encoding in response to iteratively minimizing the sum of squares error.

4. The apparatus recited in claim 1, wherein said executing a quadtree based adaptive loop filter comprises applying a non-separable filter to I pictures.

5. The apparatus recited in claim 1, further comprising:
   an encoder, said encoder comprising a second computer and programming executable on said second computer, for generating said encoded video signals and obtaining said encoded two dimensional (2D) separable filter which iteratively improves a one dimensional (1D) vertical filter and a one dimensional (1D) horizontal filter alternatively, by performing one or more steps comprising:
determining an initial estimate of the one dimensional (1D) horizontal filter and the one dimensional (1D) vertical filter from an initial non-separable two dimensional (2D) filter;
iteratively improving separable filters by alternatively holding a first of said one dimensional (1D) filters constant and determining a second of said one dimensional (1D) filters which minimizes a sum of square error; and
repeating iterations until there arise no significant changes in the two dimensional (2D) separable filter as a product of the one dimensional (1D) horizontal filter and the one dimensional (1D) vertical filter.

6. The apparatus recited in claim 5, wherein said product of the one dimensional (1D) horizontal filter and the one dimensional (1D) vertical filter converges, while each one dimensional (1D) filter is not required to converge.

7. The apparatus recited in claim 5, wherein said non-separable two dimensional (2D) filter comprises an optimal two dimensional (2D) Weiner filter.

8. The apparatus recited in claim 5, wherein said non-separable two dimensional (2D) filter comprises an approximation of an optimal two dimensional (2D) Weiner filter which has improved low pass frequency response over said optimal two dimensional (2D) Weiner filter.

9. An apparatus for encoding and decoding video signals, comprising:
(a) an encoder comprising a first computer and programming executable on said first computer for encoding video signals; and
(b) a decoder comprising a second computer and programming executable on said second computer for processing video signals encoded by said encoder by performing steps comprising:
(i) performing entropy decoding;
(ii) reconstructing macroblocks using inverse quantization, inverse transforms, and prediction to reconstruct each macroblock;
(iii) executing a deblocking filter;
(iv) executing a quadtree based adaptive loop filter having separable filters for P and B pictures;
(v) wherein said separable filters comprise a two dimensional (2D) separable filter as a product of a one-dimensional (1D) vertical filter and a one dimensional (1D) horizontal filter;
(vi) wherein said 1D horizontal filter and said 1D vertical filter are initially determined from a non-separable 2D filter, followed by iteratively minimizing error for pixels within ON regions of a quadtree structure of said quadtree based adaptive loop filter;
(vii) wherein said minimizing error is performed by determining a matrix and a cross correlation that assumes said 2D separable filter is not zero phase and performing a transposition on the 2D separable filter and cross correlation; and
(viii) outputting a decoded video signal.

10. The apparatus recited in claim 9, wherein said quadtree adaptive loop filter comprises separable Wiener filters.

11. The apparatus recited in claim 9, wherein said programming on said first computer obtains said separable filter, f, in response to iteratively minimizing sum of squares error $\xi(f)$, by performing steps comprising:

(a) determining a matrix A of size $S_h \times S_h$ and a cross correlation b within an equation $$\xi(f) = \sum_{m \in S_y} (y_m)^2 + f^T A f - 2 b^T f,$$

in which m represents each pel position within $S_y$, which denotes support of y as pixels within ON regions of a quadtree structure, T represents transposition of a vector, and assumes that a two dimensional (2D) filter is not zero phase;
(b) replacing A by $A+\sigma 1$ where $\sigma$ is a predetermined fraction of number of pixels in $S_y$;
(c) representing an optimal non-separable filter f as a two dimensional (2D) matrix $F_0$ and a scalar $f_n$;
(d) obtaining an initial approximation of the vertical filter $g^0$ by adding a column vector of optimal filter $F_o$, and obtaining an initial approximation of a horizontal filter $(h^0)^T$ by adding row vectors of optimal filter $F_o$, while letting $g_n^0 = f_n$ and $h_n^0 = 1$; and
(e) repeating a desired number of iterations k, or until a desired level of convergence is obtained, one or more steps comprising:
(i) substituting filter $g^{k-1}$ and $g_n^{k-1}$ into a sum of squares error and computing $h^k$ and $h_n^k$ to minimize the sum of squares error;
(b) substituting filter $h^k$ and $h_n^k$ into the sum of squares error and computing $g^k$ and $g_n^k$ to minimize the sum of squares error; and
(c) determining separable filter g, $g_n$, h, $h_n$, as $g = g^k \cdot h_{n/2}^k$, $$h = h^k \cdot \frac{1}{h_{n/2}^k},$$

$f_n = g_n^k \cdot h_n^k$, in response to letting $g^k = [g_0^k\ g_1^k\ \ldots\ g_{n-1}^k]^T$, $g_n^k$, $h^k = [h_0^k\ h_1^k\ \ldots\ h_{n-1}^k]^T$, $h_n^k$.

12. The apparatus recited in claim 9, wherein said programming of said first computer obtains said two dimensional (2D) separable filter in response to iteratively improving a one dimensional (1D) vertical filter and a one dimensional (1D) horizontal filter alternatively, by performing one or more steps comprising:
determining an initial estimate of the one dimensional (1D) horizontal filter and the one dimensional (1D) vertical filter from an initial non-separable two dimensional (2D) filter;
iteratively improving separable filters by alternatively holding one of the one dimensional (1D) filters constant and determining the other one dimensional (1D) filter which minimizes the sum of square error; and
repeating iterations until there arise no significant changes in the two dimensional (2D) separable filter as a product of the one dimensional (1D) horizontal filter and the one dimensional (1D) vertical filter.

13. The apparatus recited in claim 12, wherein said product of said one dimensional (1D) horizontal filter and said one dimensional (1D) vertical filter converges, while each one dimensional (1D) filter is not required to converge.

14. The apparatus recited in claim 12, wherein said non-separable two dimensional (2D) filter comprises an optimal two dimensional (2D) Weiner filter.

15. The apparatus recited in claim 12, wherein said non-separable two dimensional (2D) filter comprises an approximation of an optimal two dimensional (2D) Weiner filter which has improved low pass frequency response over said optimal two dimensional (2D) Weiner filter.

16. A method of decoding encoded video signals received from a video encoder, the video encoder configured for performing iterations of a quadtree based adaptive loop filter to minimize a sum of squares error, the method comprising:

performing entropy decoding of the video signals;

reconstructing macroblocks using inverse quantization, inverse transforms, and prediction to reconstruct each macroblock;

executing a deblocking filter;

executing, on a computer, a quadtree based adaptive loop filter having separable filters for P and B pictures, and one non-separable filter for I pictures;

wherein said separable filters are a two dimensional (2D) separable filter determined as a product of a one-dimensional (1D) vertical filter and a one dimensional (1D) horizontal filter, wherein said 1D horizontal filter and said 1D vertical filter are initially determined from a non-separable 2D filter, followed by iteratively minimizing error for pixels within ON regions of a quadtree structure of said quadtree based adaptive loop filter;

wherein said minimizing error is performed by determining a matrix and a cross correlation that assumes said separable 2D filter is not zero phase and performing a transposition on the 2D separable filter and cross correlation; and outputting a decoded video signal.

17. The method recited in claim 16, wherein said quadtree based adaptive loop filter comprises separable Wiener filters.

18. The method recited in claim 16, wherein the entropy decoding comprises receiving differentially encoded coefficients within a slice header received from an encoder which defines separable filters obtained during encoding in response to iteratively minimizing the sum of squares error.

19. The method recited in claim 16, wherein said two dimensional (2D) separable filter is obtained in a video encoder in response to iteratively improving a one dimensional (1D) vertical filter and a one dimensional (1D) horizontal filter.

* * * * *